(12) United States Patent
Peterson et al.

(10) Patent No.: US 10,877,596 B2
(45) Date of Patent: Dec. 29, 2020

(54) FINE ADJUSTMENT OF A LINEAR CONTROL

(71) Applicant: LENOVO (Singapore) PTE. LTD., New Tech Park (SG)

(72) Inventors: Nathan J. Peterson, Oxford, NC (US); Mark Patrick Delaney, Raleigh, NC (US); John Carl Mese, Cary, NC (US); Russell Speight VanBlon, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 16/367,212

(22) Filed: Mar. 27, 2019

(65) Prior Publication Data

US 2020/0310616 A1 Oct. 1, 2020

(51) Int. Cl.
*G06F 3/041* (2006.01)
*G06F 3/0488* (2013.01)

(52) U.S. Cl.
CPC ...... *G06F 3/04166* (2019.05); *G06F 3/04883* (2013.01)

(58) Field of Classification Search
CPC .. G06F 3/0488; G06F 3/0416; G06F 3/04815; G06F 3/04166; G06F 3/04883; G06F 21/32; G06K 9/0012
See application file for complete search history.

(56) References Cited

U.S. PATENT DOCUMENTS

| 2010/0044121 A1* | 2/2010 | Simon | G06F 3/0488 178/18.03 |
|---|---|---|---|
| 2010/0066697 A1* | 3/2010 | Jacomet | G06F 21/32 345/173 |
| 2011/0210943 A1* | 9/2011 | Zaliva | G06F 3/0416 345/174 |
| 2012/0056846 A1* | 3/2012 | Zaliva | G06F 3/04883 345/174 |
| 2018/0232558 A1* | 8/2018 | Jung | G06F 3/04815 |
| 2018/0276439 A1* | 9/2018 | Strohmann | G06K 9/0012 |

\* cited by examiner

*Primary Examiner* — Richard J Hong
(74) *Attorney, Agent, or Firm* — Kunzler Bean & Adamson (57) ABSTRACT

For fine adjustment of linear control, a processor detects a specified touch of a finger on a linear control of the touch screen. In response to detecting the specified touch, the processor measures a rolling contact of the finger on the touch screen. Subareas of the finger maintain contact with corresponding pixels of the touch screen. The processor modifies the linear control as a function of the rolling contact.

17 Claims, 6 Drawing Sheets

| Contact Time 201 |
| Subarea Maps 203 |
| Corresponding Pixel Maps 205 |
| Rolling Contact Angle 207 |
| Linear Control Transform 209 |
| Linear Control Modification 211 |
| Thresholds 213 |

FIG. 5B ated linear control is disclosed. The apparatus includes a touch screen, a processor, and a memory. The memory stores code executable by the processor. The processor detects a specified touch of a finger on a linear control of the touch screen. In response to detecting the specified touch, the processor measures a rolling contact of the finger on the touch screen. Subareas of the finger maintain contact with corresponding pixels of the touch screen. The processor modifies the linear control as a function of the rolling contact. A method and program product also perform the functions of the apparatus.

FINE ADJUSTMENT OF A LINEAR CONTROL

FIELD

The subject matter disclosed herein relates to controls and more particularly relates to fine adjustment of a linear control.

BACKGROUND

Controls on a touch screen may be difficult to finely adjust.

BRIEF SUMMARY

An apparatus for fine adjustment of linear control is disclosed. The apparatus includes a touch screen, a processor, and a memory. The memory stores code executable by the processor. The processor detects a specified touch of a finger on a linear control of the touch screen. In response to detecting the specified touch, the processor measures a rolling contact of the finger on the touch screen. Subareas of the finger maintain contact with corresponding pixels of the touch screen. The processor modifies the linear control as a function of the rolling contact. A method and program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
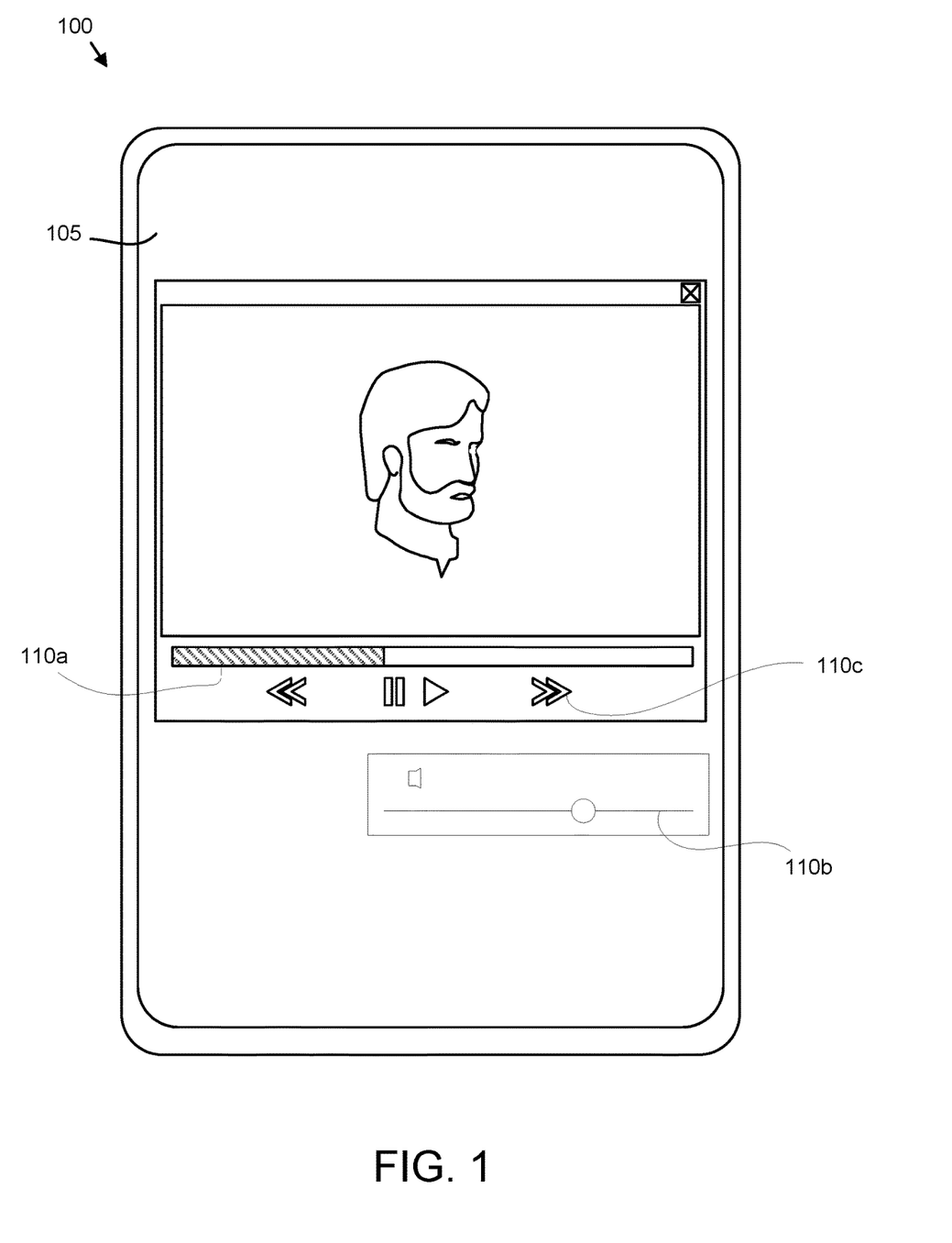
FIG. 1 is a front view drawing illustrating one embodiment of a touch screen with linear controls.

FIG. 1 is a front view drawing illustrating one embodiment of a touch screen 105 with linear controls 110*a-c*. In the depicted embodiment, the touch screen 105 is embodied in electronic device 100. The touch screen 105 may present one or more linear controls 110*a-c*. A first linear control 110*a* may specify a time frame for a video data stream. A second linear control 110*b* may specify an intensity of audio output for the video. A third linear control 110*c* may fast-forward to time frames of the video. As used herein, a linear control 110 selects a value between a first value and a second value over a numerical range. For example, a linear control 110 may select a value between zero and 100. The values may be integers or real numbers. The values may also represent discrete objects.

A user may employ a finger to adjust the linear controls 110. Unfortunately, because the size of a finger may be large relative to the resolution of the linear control 110, it may be difficult for the user to precisely select a desired value.

The embodiments described herein measure a rolling contact of the finger on the touch screen 105 and modify the linear control 110 as a function of the rolling contact as will be described hereafter. As a result, the user is able to precisely select values with the linear control 110 and make fine modifications to the linear control 110, greatly enhancing the operation and the utility of the linear control 110 and the electronic device 100.

Figure 2A:
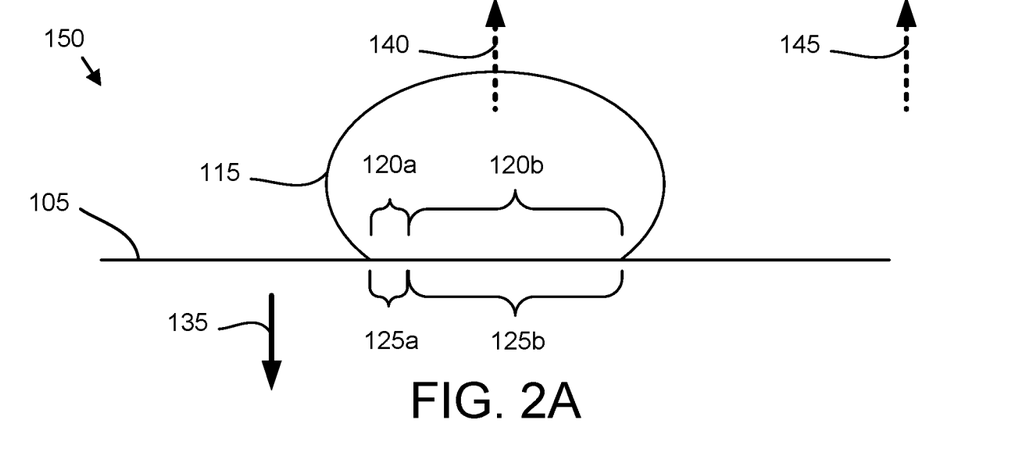
FIGS. 2A-B are top view drawings illustrating embodiments of rolling contact.
Figure 2B:
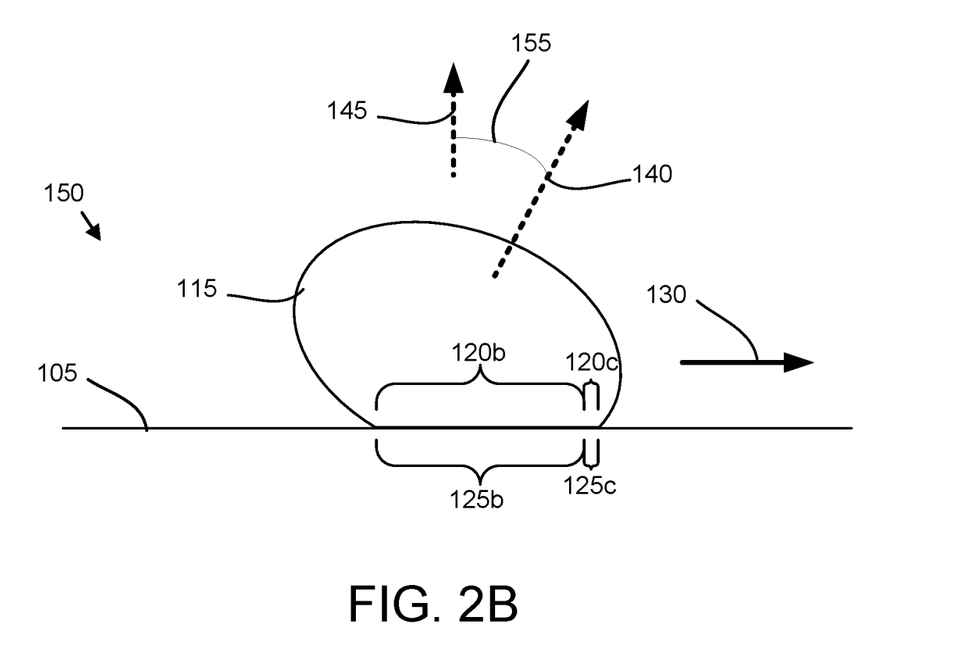

FIGS. 2A-B are top view drawings illustrating embodiments of the rolling contact 150. In the depicted embodiments, a finger 115 is shown disposed on the surface of a touch screen 105. FIG. 2A shows the beginning of the rolling contact 150 and FIG. 2B shows the end of the rolling contact 150. A finger normal axis 140 for the finger 115 and a screen normal axis 145 for the touch screen are also shown. The finger normal axis 140 is parallel the screen normal axis 145 at the beginning of the rolling contact 150. A contact angle 155 is shown between the finger normal axis 140 and the screen normal axis 145. The contact angle 155 may be equivalent to the rolling contact angle.

Subareas 120 of the finger 115 contact corresponding pixels 125 of the touch screen 105. In FIG. 2A, a first subarea 120a and the second subarea 120b of the finger 115 contact first corresponding pixels 125a and second corresponding pixels 125b of the touch screen 105. In one embodiment, a subarea 120 is detected in response to a medial force 135 imparted by the finger 115 to the touch screen 105.

The user may further roll the finger 115 across the surface of the touch screen 105. As a result, the first subarea 120a no longer contacts the first corresponding pixels 125a. In addition, a third subarea 120c of the finger 115 contacts third corresponding pixels 125c of the touch screen 105.

During the rolling contact 150, subareas 120 of the finger 115 such as the second subarea 120b maintain contact with the corresponding pixels 125 such as the second corresponding pixels 125b of the touch screen 105. As a result, the rolling contact 150 is distinguished from a sliding contact wherein no subareas 120 of the finger 115 maintain contact with corresponding pixels 125 of the touch screen 105.

The rolling contact 150 is further distinguished from an intermittent contact wherein the finger 115 contacts the touch screen 105 at a first position, is lifted from the touch screen 105, and contacts the touch screen 105 at a second position, as no subareas 120 of the finger 115 maintain contact with corresponding pixels 125 of the touch screen 105.

In one embodiment, the rolling contact 150 is detected in response to a change in the subareas 120 and corresponding pixels 125 with the lateral force 130 imparted by the finger 115 to the touch screen 105 that is less than a lateral threshold. In contrast, a sliding contact of the finger 115 may impart a lateral force 130 greater than the lateral threshold.

Figure 3:
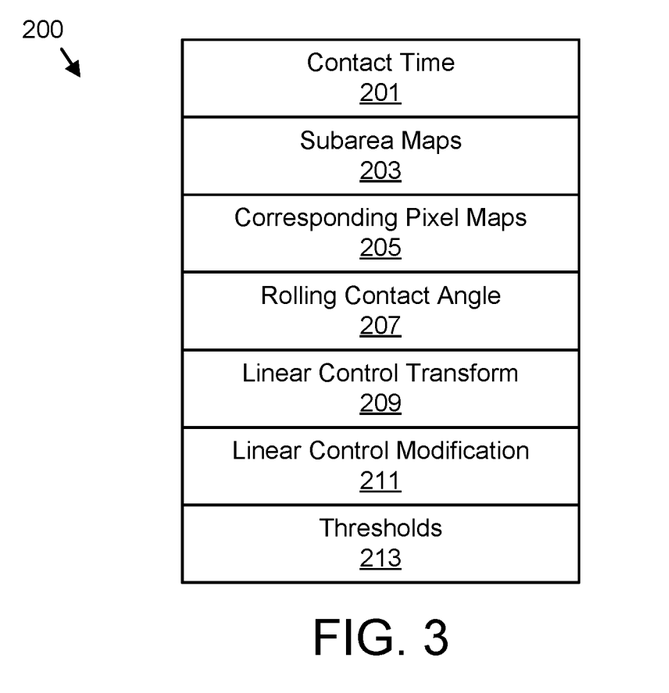
FIG. 3 is a schematic block diagram illustrating one embodiment of contact data.

FIG. 3 is a schematic block diagram illustrating one embodiment of contact data 200. The contact data 200 may be organized as a data structure in a memory. In the depicted embodiment, the contact data 200 includes a contact time 201, subarea maps 203, corresponding pixel maps 205, a rolling contact angle 207, a linear control transform 209, a linear control modification 211, and thresholds 213.

The thresholds 213 may store thresholds, intervals, and the like for making determinations. For example, the thresholds 213 may include the lateral threshold.

The contact time 201 may record a time interval that the finger 115 maintains contact with the touch screen 105. In one embodiment, the contact time 201 may be used to determine a long press wherein the finger 115 maintains contact with the touch screen 105 for greater than a long press time interval. The long press time interval may be in the range of 0.8 to 1.2 seconds. The long press time interval may be stored in the thresholds 213.

The subarea maps 203 may record subareas 120 of the finger 115. The subarea maps 203 may include distinguishing features of subareas 120 such as finger ridges. The corresponding pixel maps 205 may record the pixels of the touch screen 105 that correspond to the subareas 120 of the subarea maps 203.

In one embodiment, a plurality of pixels are aggregated within a corresponding pixel map 205, wherein the plurality of pixels include a distinguishing feature of the subarea 120. In a certain embodiment, a plurality of pixels are aggregated within a corresponding pixel map 205 for a specified time frame. The subareas 120 and the corresponding pixels 125 may be determined from changes in the plurality of pixels between corresponding pixel maps 205 of a sequence of time frames.

The rolling contact angle 207 may specify an angle of the rolling contact 150. The rolling contact angle 207 may be the contact angle 155. In one embodiment, the rolling contact angle 207 is calculated as a function of the subareas 120 and the corresponding pixels 125. In a certain embodiment, the rolling contact angle 207 is calculated as a function of the corresponding pixels 125. The rolling contact angle RCA 207 may be calculated using Equation 1, where CP1 is an area of first corresponding pixels 125a, CP2 is an area of second corresponding pixels 125b, and k is a nonzero constant CP1 and CP2 may be the areas of two different time frames.

$$RCA = k\sqrt{CP1/CP2}$$ Equation 1

In one embodiment, the rolling contact angle 207 is calculated using a lookup table. Table 1 illustrates one embodiment of calculating the rolling contact angle 207 using a lookup table wherein each area of corresponding pixels 125 is expressed as a percentage of an initial area of corresponding pixels 125 for a subarea 120 for an initial time frame when the finger 115 first contacted the touch screen 105 for a subsequent area of corresponding pixels 125 in a subsequent time frame.

TABLE 1

| Area of Corresponding Pixels 125 | Rolling Contact Angle 207 |
|---|---|
| 95% | 10 degrees |
| 82% | 20 degrees |
| 69% | 30 degrees |
| 64% | 40 degrees |
| 57% | 50 degrees |
| 52% | 60 degrees |
| 49% | 70 degrees |
| 46% | 80 degrees |
| 43% | 90 degrees |

In one embodiment, the rolling contact angle 207 is negative for a rolling contact 150 to the left and positive for rolling contact 150 to the right. In addition, the rolling contact angle 207 may be positive for a rolling contact 150 upward and negative for a rolling contact 150 downward.

The linear control transform 209 may modify the linear control 110 as a function of the rolling contact 150 and/or the rolling contact angle 207. Tables 2 and 3 illustrate exemplary linear control transforms 209. In Table 2, the modification may be added to a value of the linear control 110.

TABLE 2

| Rolling Contact Angle 207 | Modification |
|---|---|
| −90 degrees | −4.0 |
| −80 degrees | −3.5 |
| −70 degrees | −3.0 |
| −60 degrees | −2.5 |

TABLE 2-continued

| Rolling Contact Angle 207 | Modification |
| --- | --- |
| −50 degrees | −2.0 |
| −40 degrees | −1.5 |
| −30 degrees | −1.0 |
| −20 degrees | −0.5 |
| −10 degrees | −0.25 |
| 0 degrees | 0.0 |
| 10 degrees | 0.25 |
| 20 degrees | 0.5 |
| 30 degrees | 1.0 |
| 40 degrees | 1.5 |
| 50 degrees | 2.0 |
| 60 degrees | 2.5 |
| 70 degrees | 3.0 |
| 80 degrees | 2.5 |
| 90 degrees | 4.0 |

In Table 3, the modification may be multiplied with a value of the linear control 110.

TABLE 3

| Rolling Contact Angle 207 | Modification |
| --- | --- |
| −90 degrees | 0.78 |
| −80 degrees | 0.82 |
| −70 degrees | 0.85 |
| −60 degrees | 0.88 |
| −50 degrees | 0.90 |
| −40 degrees | 0.92 |
| −30 degrees | 0.94 |
| −20 degrees | 0.96 |
| −10 degrees | 0.98 |
| 0 degrees | 0.0 |
| 10 degrees | 1.02 |
| 20 degrees | 1.04 |
| 30 degrees | 1.06 |
| 40 degrees | 1.08 |
| 50 degrees | 1.10 |
| 60 degrees | 1.12 |
| 70 degrees | 1.15 |
| 80 degrees | 1.18 |
| 90 degrees | 1.22 |

In one embodiment, the modification M may be calculated using Equation 2, where k is a nonzero constant.

$$M = k\sqrt{RCA} \qquad \text{Equation 2}$$

The linear control modification 211 may be a modified value of an original value of the linear control 110. The linear control modification LCM 211 may be calculated using Equation 3, where V is the original value of the linear control 110.

$$LCM = M * V \qquad \text{Equation 3}$$

In addition, the linear control modification LCM 211 may be calculated using Equation 4.

$$LCM = M + V \qquad \text{Equation 4}$$

Figure 4:
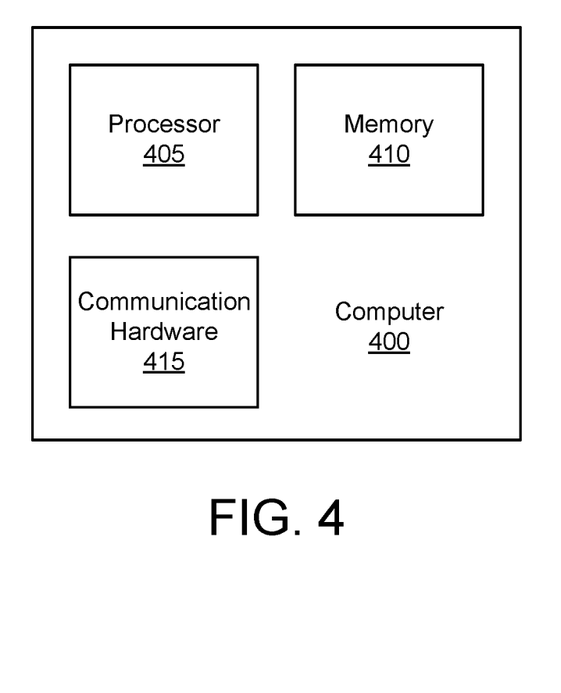
FIG. 4 is a schematic block diagram illustrating one embodiment of a computer.

FIG. 4 is a schematic block diagram illustrating one embodiment of a computer 400. The computer 400 may be embodied in the electronic device 100. In the depicted embodiment, the computer 400 includes a processor 405, a memory 410, and communication hardware 415. The memory 410 may include a semiconductor storage device, hard disk drive, a micromechanical storage device, an optical storage device, or combinations thereof. The memory 410 may store code. The processor 405 may execute the code. The communication hardware 415 may communicate with other devices such as the touch screen 105.

Figure 5A:
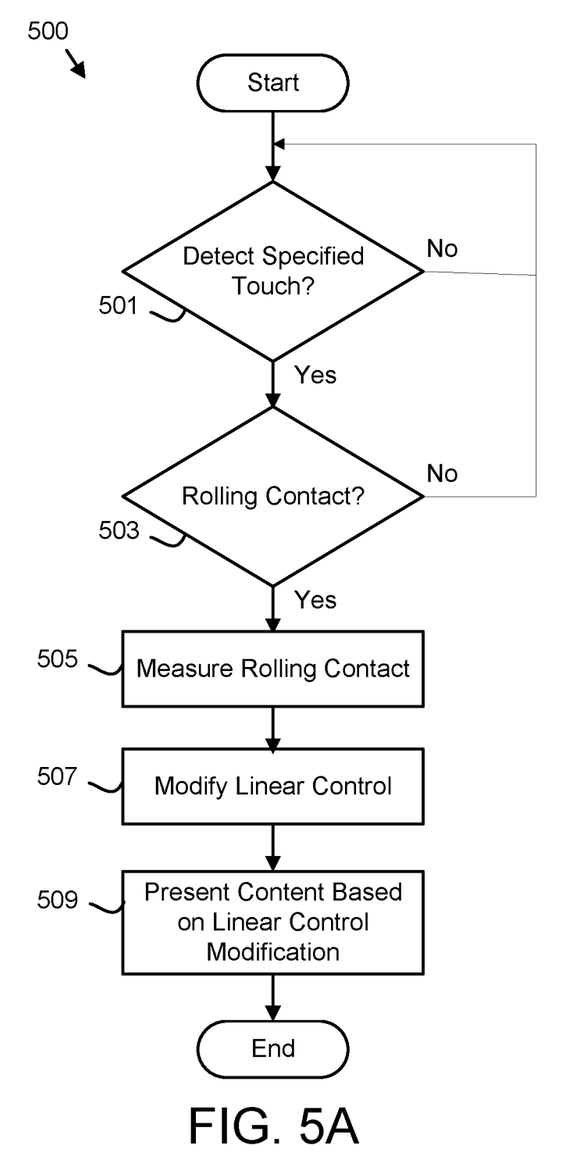
FIG. 5A is a schematic flow chart diagram illustrating one embodiment of linear control modification method.

FIG. 5A is a schematic flow chart diagram illustrating one embodiment of linear control modification method 500. The method 500 may modify a linear control 110 based on a rolling contact 150. In addition, the method 500 may present content based on the modified linear control 110. The method 500 may be performed by the computer 400 and/or the processor 405.

The method 500 starts, and in one embodiment, the processor 405 detects 501 a specified touch of a finger 115 on a linear control 110 of a touch screen 105. The specified touch may be a long press of the finger 115 on the linear control 110.

Alternatively, the specified touch may be a double tap of the finger 115 on the linear control 110. The finger 115 may be disposed on the linear control 110 at an end of the second tap of the double tap. In addition, the specified touch may be the finger 115 resting on the linear control 110.

In one embodiment, the specified touch comprises the finger 115 pressing upon the linear control 110 with a medial force 135 that exceeds a medial threshold of the thresholds 213. In a certain embodiment, the specified touch comprises the finger 115 pressing upon the linear control 110 with a first medial force 135 followed by the finger 115 pressing upon the linear control 110 with the second medial force 135 that is greater than the first medial force 135 multiplied by a medial constant of the thresholds 213, followed by the finger 115 pressing upon the linear control 110 with the third medial force 135 that is within the first medial force 135 multiplied by a medial range of the thresholds 213.

In response to detecting the specified tough, the processor 405 may detect 503 a rolling contact 150 of the finger 115 on the touch screen 105. The rolling contact 150 may be detected 503 as described in FIGS. 2A-B. In one embodiment, subareas 120 of the finger 115 maintain contact with corresponding pixels 125 of the touch screen 105 during the rolling contact 150.

The processor 405 may further measure 505 the rolling contact 150. The processor 405 may measure 505 the rolling contact 150 by calculating a rolling contact angle 207 of the rolling contact 150. The measurement 505 of the rolling contact 150 is described in more detail in FIG. 5B.

The processor 405 may further modify 507 the linear control 110 as a function of the rolling contact 150. The linear control 110 may be modified as a function of the rolling contact angle 207 as described for FIG. 3 by determining the linear control modification 211.

In one embodiment, the linear control modification 211 specifies one of a time frame change in a data stream and a rate of time frame change in the data stream. For example, the linear control modification 211 may change the time frame of the video data stream for the first linear control 110a of FIG. 1. In addition, the linear control modification 211 may specify a rate of time frame change of the fast-forward third linear control 110c in FIG. 1.

In one embodiment, the linear control modification 211 specifies one of an intensity change and a rate of intensity change. For example, the linear control modification 211 may specify an intensity change such as an audio intensity change for the second linear control 110b of FIG. 1. In addition, the linear control modification 211 may specify a rate of intensity change.

In a certain embodiment, the linear control modification 211 specifies one of a linear position and a rate of linear position change. For example, the linear control modification 211 may specify a linear position of a cursor. In addition, the linear control modification 211 may specify a rate of linear position change for the cursor.

The processor 405 may further present 509 content based on the linear control modification 211 and the method 500 ends. Continuing the example of FIG. 1, the processor 405 may present 509 the video content at the time frame specified by the linear control modification 211.

Figure 5B:
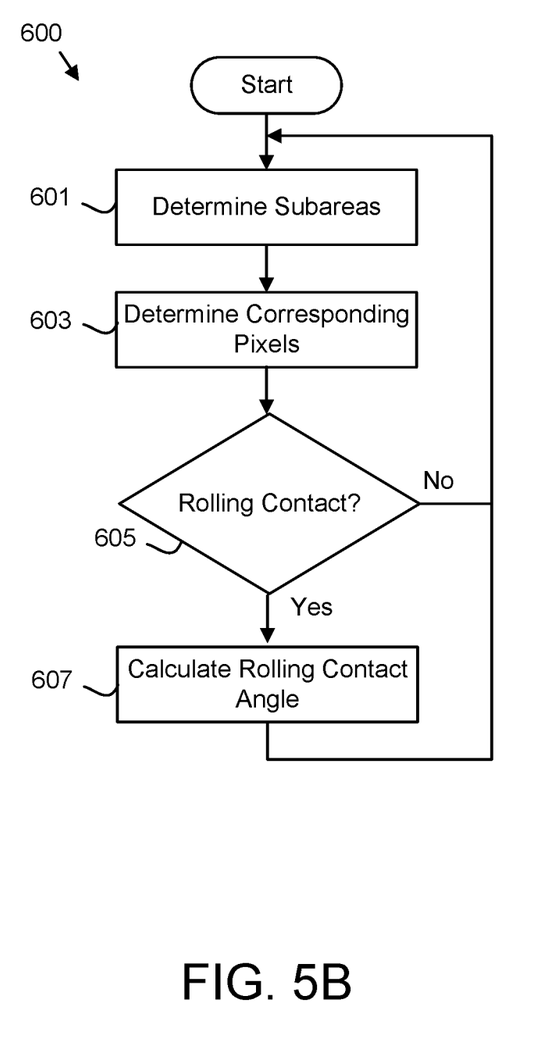
FIG. 5B is a schematic flow chart diagram illustrating one embodiment of a rolling contact measurement method.

FIG. 5B is a schematic flow chart diagram illustrating one embodiment of a rolling contact measurement method 600. The method 600 may calculate the rolling contact angle 207. The method 600 may be performed by the computer 400 and/or the processor 405.

The method 600 starts, and in one embodiment, the processor 405 determines 601 the subareas 120 of the finger 115 in contact with the touch screen 105. In one embodiment, the processor 405 determines 601 the subareas 120 from the medial force 135 applied to the touch screen 105. In addition, the subareas 120 may be determined 601 by optically detecting the finger 115. The subareas 120 may be recorded as subarea maps 203.

The processor 405 further determines 603 the corresponding pixels 125 that correspond to the subareas 120. The corresponding pixels 125 may be recorded as corresponding pixel maps 205. In one embodiment, the corresponding pixels 125 are determined for a plurality of time frames.

The processor 405 may detect 605 the rolling contact 150 of the finger 115 on the touch screen 105. The rolling contact 150 may be detected in response to both the specified touch and subareas 120 of the finger 115 maintaining contact with corresponding pixels 125.

In one embodiment, the corresponding pixels 125 for the plurality of time frames are compared to identify the rolling contact 150. The rolling contact 150 may be characterized by some subareas 120 of the finger 115 maintaining contact with corresponding pixels 125 of the touch screen 105 while other subareas 120 lose contact with corresponding pixels 125 and/or other subareas 120 established contact with corresponding pixels 125.

In addition, the processor 405 may calculate 607 the rolling contact angle 207. The rolling contact angle 207 may be calculated 607 as described in FIG. 3.

The embodiments measure the rolling contact 150 of the finger 115 on the touch screen 105 and modify the linear control 110 as a function of the rolling contact 150. As a result, the embodiments may finely modify the linear control 110, improving the functionality of the linear control 110 and the computer 400.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a touch screen;
    a processor;
    a memory that stores code executable by the processor to:
    detect a specified touch of a finger on a linear control of the touch screen;
    in response to detecting the specified touch, measure a rolling contact angle of the finger on the touch screen by recording subarea maps of subareas of the finger that correspond to pixels of the touch display, wherein subareas of the finger maintain contact with corresponding pixels of the touch screen and the subarea maps comprise finger ridges of the finger, and calculating the rolling contact angle based on a percentage of an initial area of the corresponding pixels of a first subarea for an initial time frame for a subsequent area of the corresponding pixels for a subsequent time frame; and
    modify the linear control as a function of the rolling contact angle.

2. The apparatus of claim 1, wherein the specified touch is a long press and the finger maintains contact with the touch screen for greater than a long press time interval.

3. The apparatus of claim 1, wherein the linear control is modified as a function of the rolling contact angle.

4. The apparatus of claim 1, wherein a linear control modification specifies one of a time frame change in a data stream and a rate of time frame change in the data stream.

5. The apparatus of claim 1, wherein a linear control modification specifies one of an intensity change and a rate of intensity change.

6. The apparatus of claim 1, wherein a linear control modification specifies one of a linear position and a rate of linear position change.

7. A method comprising:
    detecting, by use of a processor, a specified touch of a finger on a linear control of a touch screen;
    in response to detecting the specified touch, measure a rolling contact angle of the finger on the touch screen by recording subarea maps of subareas of the finger that correspond to pixels of the touch display, wherein subareas of the finger maintain contact with corresponding pixels of the touch screen and the subarea maps comprise finger ridges of the finger, and calculating the rolling contact angle based on a percentage of an initial area of the corresponding pixels of a first subarea for an initial time frame for a subsequent area of the corresponding pixels for a subsequent time frame; and
    modifying the linear control as a function of the rolling contact angle.

8. The method of claim 7, wherein the specified touch is a long press and the finger maintains contact with the touch screen for greater than a long press time interval.

9. The method of claim 7, wherein the linear control is modified as a function of the rolling contact angle.

10. The method of claim 7, wherein a linear control modification specifies one of a time frame change in a data stream and a rate of time frame change in the data stream.

11. The method of claim 7, wherein a linear control modification specifies one of an intensity change and a rate of intensity change.

12. The method of claim 7, wherein a linear control modification specifies one of a linear position and a rate of linear position change.

13. A program product comprising a non-transitory computer readable storage medium that stores code executable by a processor, the executable code comprising code to:
    detect a specified touch of a finger on a linear control of a touch screen;
    in response to detecting the specified touch, measure a rolling contact angle of the finger on the touch screen by recording subarea maps of subareas of the finger that correspond to pixels of the touch display, wherein subareas of the finger maintain contact with corresponding pixels of the touch screen and the subarea maps comprise finger ridges of the finger, and calculating the rolling contact angle based on a percentage of an initial area of the corresponding pixels of a first subarea for an initial time frame for a subsequent area of the corresponding pixels for a subsequent time frame; and modify the linear control as a function of the rolling contact angle.

14. The program product of claim 13, wherein the specified touch is a long press and the finger maintains contact with the touch screen for greater than a long press time interval.

15. The program product of claim 13, wherein the linear control is modified as a function of the rolling contact angle.

16. The program product of claim 13, wherein a linear control modification specifies one of a time frame change in a data stream and a rate of time frame change in the data stream.

17. The program product of claim 13, wherein a linear control modification specifies one of an intensity change, a rate of intensity change, a linear position, and a rate of linear position change.

* * * * *